3 Sheets—Sheet 1.

J. I. WILLIAMS.

THREE-HIGH ROLLING MILL.

No. 10,104. Reissued May 2, 1882.

Witnesses
E. L. Parker
R. H. Whitney

Inventor John I. Williams
By Attorney George H. Christy

3 Sheets—Sheet 2.

J. I. WILLIAMS.

THREE-HIGH ROLLING MILL.

No. 10,104. Reissued May 2, 1882.

Witnesses
C. L. Parker
R. H. Whitney

Inventor John I. Williams
By Attorney George H. Christy

3 Sheets—Sheet 3.

J. I. WILLIAMS.

THREE-HIGH ROLLING MILL.

No. 10,104. Reissued May 2, 1882.

Witnesses,
C. L. Parker
R. H. Whiteley

Inventor John I. Williams
By Attorney George H. Christy

UNITED STATES PATENT OFFICE.

JOHN I. WILLIAMS, OF PITTSBURG, PENNSYLVANIA.

THREE-HIGH ROLLING-MILL.

SPECIFICATION forming part of Reissued Letters Patent No. 10,104, dated May 2, 1882.

Original No. 169,071, dated October 19, 1875. Application for reissue filed November 21, 1879.

*To all whom it may concern:*

Be it known that I, JOHN I. WILLIAMS, late of Millvale, but now of Pittsburg, in the county of Allegheny and State of Pennsylvania, have invented a new and useful Improvement in Rolling-Mills of the class commonly known as "Three-High;" and I do hereby declare the following to be a full, clear, concise, and exact description of the same, such as will enable those skilled in the art to which it appertains to make and use it, reference being had to the accompanying drawings, making a part hereof, in which—

Figure 1:
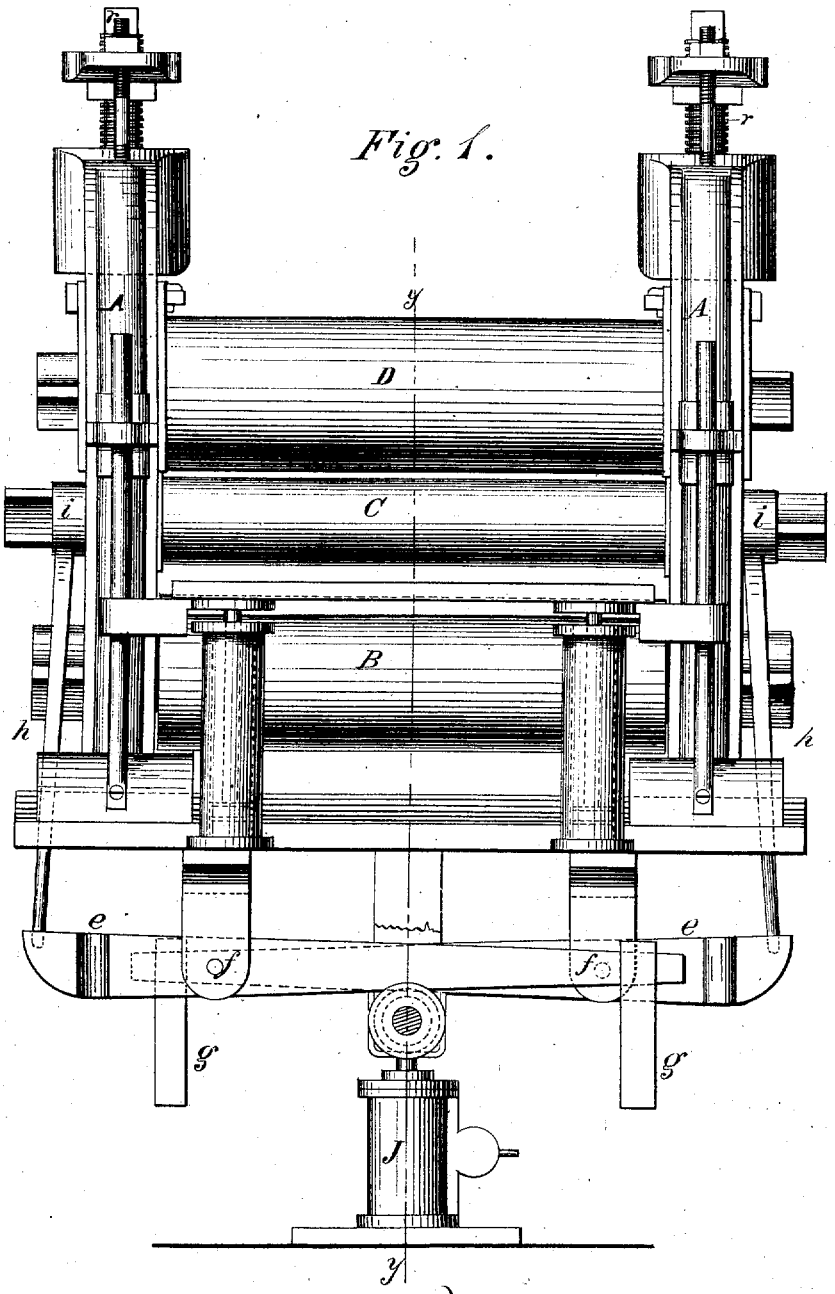
Figure 2:
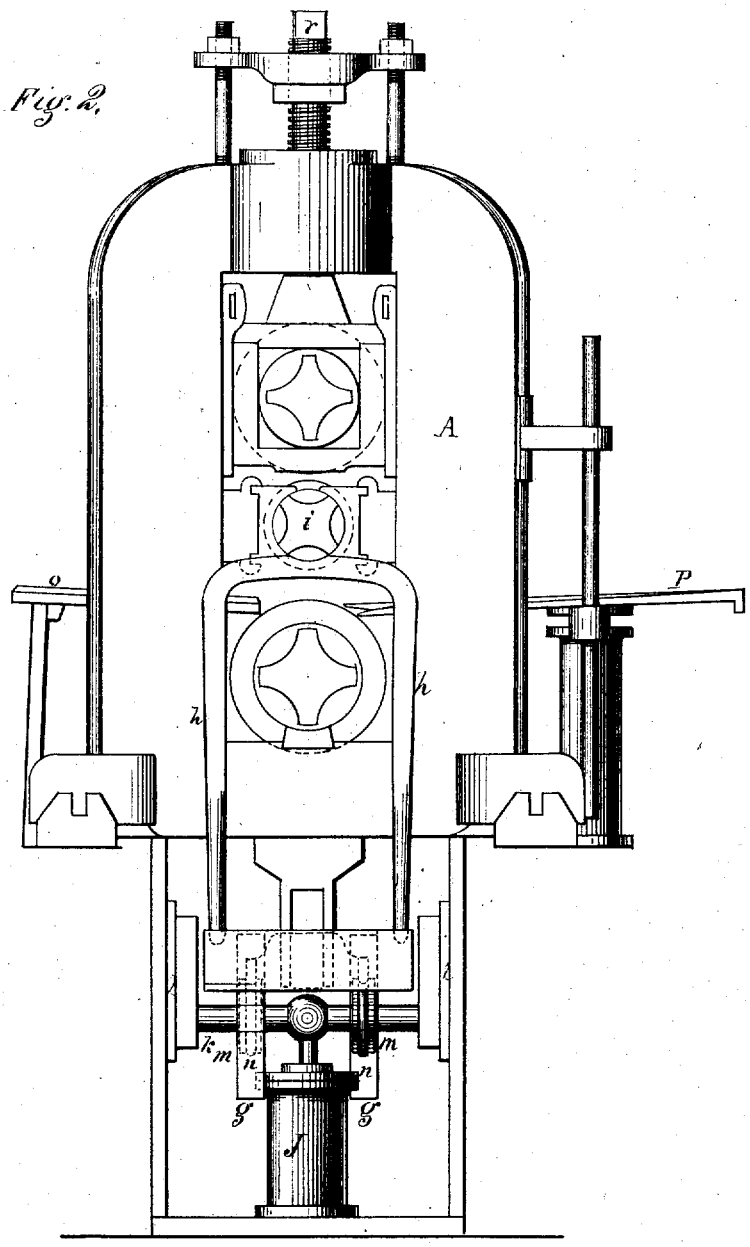
Figure 3:
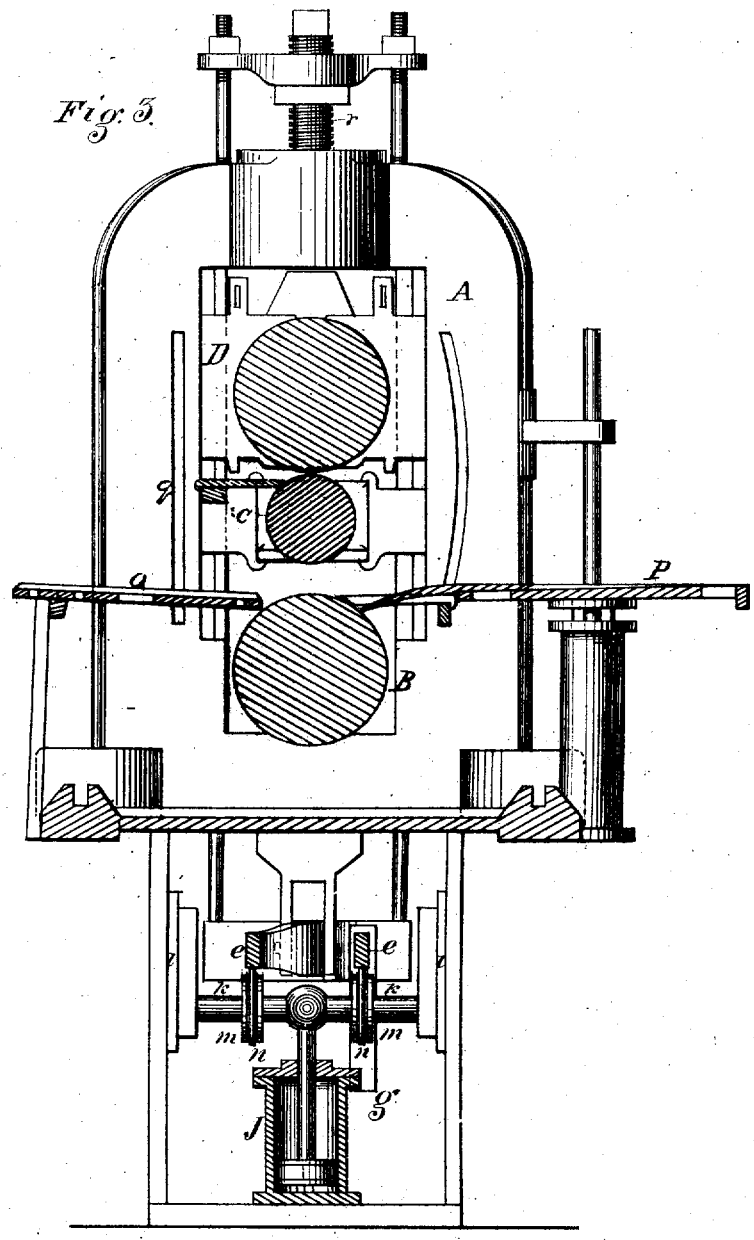

Figure 1 is a front elevation of a three-high mill with my present improvement applied thereto. Fig. 2 is an end elevation of the same; and Fig. 3 is a vertical section in the plane of the line *y y*, Fig. 1.

Like letters of reference indicate like parts.

My improvement relates, in general terms, to the combination, with the middle movable roll of a three-high mill, of a fluid-pressure cylinder and piston and suitable connections, whereby such movable middle roll may quickly, expeditiously, and with certainty be caused to assume any desired position, at the will of the operator, with reference to either of the rolls above and below.

One object of the three-high mill is to enable the material being rolled to be rolled both ways, forward and back, without reversing the rolls, whereby the rolling operation is carried on more rapidly than when a rolling pass is given in but one direction; and in order to increase the capacity of such a mill the middle roll has been fitted up with screws, which, passing through nuts on its journals or boxes, afford a means by which the roller, after any one pass—say against the bottom roll—could readjust or set the middle roll in the proper relation to the top roll with reference to the reduction of the bar or plate at the reverse pass; but such construction is open to the objection that the bar or plate is rapidly losing its heat while waiting for the comparatively slow motion of a screw worked by hand.

By shifting the movable middle roll with the quick stroke of a steam-piston I effect a material improvement in the structure of the machine, such as enables the work to be carried on much more expeditiously, and consequently I am enabled to do much more work at the same heat; and it is also true that I am enabled to do better work, because the forward end of a "pile" or resulting bar or plate, when under a heavy rolling pressure, not unfrequently splits, especially if in piling different qualities of iron have been put together. Now, by being able to make a reverse pass at once, or before the temperature of the pile, bar, or plate has fallen below the welding-point, I am enabled to weld up such defects on the reverse pass. The same is true as to flakes, splints, &c., which sometimes turn up on the face of the pile or its resulting product in the rolling operation. These things I speak of simply as appertaining to the utility of the machine.

In the accompanying drawings, A represents the housings or frame-work for the rolls B C D and their bearings, all of which are of ordinary construction. Below the housings or frame-work A are two levers, *e*, which are pivoted at *f*, and are each furnished with a weight, *g*. On the outer end of each of the levers *e* is placed a forked arm, *h*, the upper end of which is placed under the neck or axis *i* of the center roll, C. By this arrangement of the levers *e*, weights *g*, and forked arms *h* with relation to the center roll, C, it can be balanced and also held up against the under side of the upper roll, D, if desired.

Below the pivoted levers E is placed a steam-cylinder, J, and to the end of its piston-rod, and at right angle to it, is secured a bar, *k*, the ends of which move in slides or guides *l*. On the bar *k* are grooved pulleys *m*, in the grooves of which rests the lower edge of the levers *e*, which are yoked to the grooved pulleys *m* by means of the yokes *n*, the curve of which is placed in the groove of the pulleys *m*, and their ends secured by the levers *e*. By this arrangement of the steam-cylinder J, piston-rod bar *k*, grooved pulley *m*, and yokes *n*, the operator can, by means of a lever, move the slide or other valve connected with the steam-cylinder J and admit steam into the cylinder, and thereby cause the piston to move upward or downward at will, causing the outer ends of the levers *e* to rise with the descent of the piston and lower with its ascent, whereby the center roll can be elevated or be depressed at his will by the simple movements of the lever connected to the valve, which admits steam into the cylinder J.

*o* represents a fixed fore-plate for the lower roll, B, and *p* a fore-plate which is susceptible of being raised or lowered by steam-power in the manner and by the means described in my patent for improvement in "fore-plates for rolling-mills," dated October 19, 1875, No. 169,070. To the movable bearing of the center roll, C, is secured the fore-plate *q*, or rest and guides, which is elevated and depressed with the elevation and depression of the roll C.

The operation of my improvement is as follows: The heated pile is delivered upon the fore-plate *o* and fed to the rolls B and C. Passing between them, it is delivered on the fore-plate *p*, which is elevated to a plane with the upper surface of the center roll, C, when depressed, and is then passed between it and the upper roll, D, onto the fore-plate *q*, or rest and guides, and from it down upon the fore-plate *o*, from which it is again fed between the rolls B and C and delivered upon the fore-plate *p*, which has been lowered for its reception, and thus the heated pile is passed between the lower roll, B, and the center roll, C, and the upper roll, D, and center roll, C, until it is reduced to the desired form, size, or thickness. The upper roll, D, is gradually lowered, through the medium of the adjusting-screws *r*, at each pass of the iron between the rolls. The center roll, C, is elevated when the iron is passed between it and the lower roll, B, and is lowered when the iron is passed between it and the upper roll, D.

The advantages of the improvement hereinbefore described will be apparent to those skilled in the art of rolling iron without further description.

While claiming generally in reference to the present invention the benefit of "mechanical equivalents," I desire especially to note such claim in relationship to what I have herein referred to as the steam-cylinder J, such language being descriptive of the device and not intended to exclude such other fluid-pressure cylinders as may in the operation described be the mechanical equivalents of the cylinder shown in the drawings and thus designated.

I am aware of the construction of apparatus shown and described in English Patent No. 1,025 of 1873, and disclaim the same.

It will be observed that in the English patent the power-connection for moving the roll is made through a lifting device in such manner that the roll is lowered as the lifter is raised. Such a construction will not attain the ends I have in view, since it does not provide for the necessary variable range of motion of the middle roll as compared with the proper motion of the lifter in lifting slabs, billets, &c., of different thicknesses. In other words, under the English patent the thicker the billet the shorter will be the proper motion of the lifter to bring it to the proper level for the upper pass and the less will be the downward motion of the middle roll, whereas the thicker the billet is the greater should be the downward motion of the middle roll.

It is a characteristic and distinguishing feature of the present invention that fluid-pressure may be applied to the movable middle roll so as to bring it to such desired position for rolling purposes as the variable and varying thickness of the billet may require.

I claim herein as my invention—

1. In the construction of a three-high mill, the manner of combining the fluid-pressure cylinder and movable middle roll, substantially as and for the purposes set forth.

2. The combination, in a three-high mill, of the middle roll, C, the fore-plate or rest *o*, movable fore-plate *p*, guide *q*, movable with the roll and cylinder J, and interposed connections for conveying the power of the cylinder to the roll, substantially as set forth.

In witness whereof I have hereunto set my hand.

JOHN I. WILLIAMS.

Witnesses:
R. H. WHITTLESEY,
C. L. PARKER.